Sept. 29, 1959

G. O. SHECTER 2,906,070

DEVICE FOR DISPENSING AND COUNTING HOMOGENEOUS OBJECTS

Filed July 30, 1954

GEORGE O. SHECTER,
INVENTOR.

BY O O Martin

ATTORNEY.

Sept. 29, 1959   G. O. SHECTER   2,906,070
DEVICE FOR DISPENSING AND COUNTING HOMOGENEOUS OBJECTS
Filed July 30, 1954   2 Sheets-Sheet 2
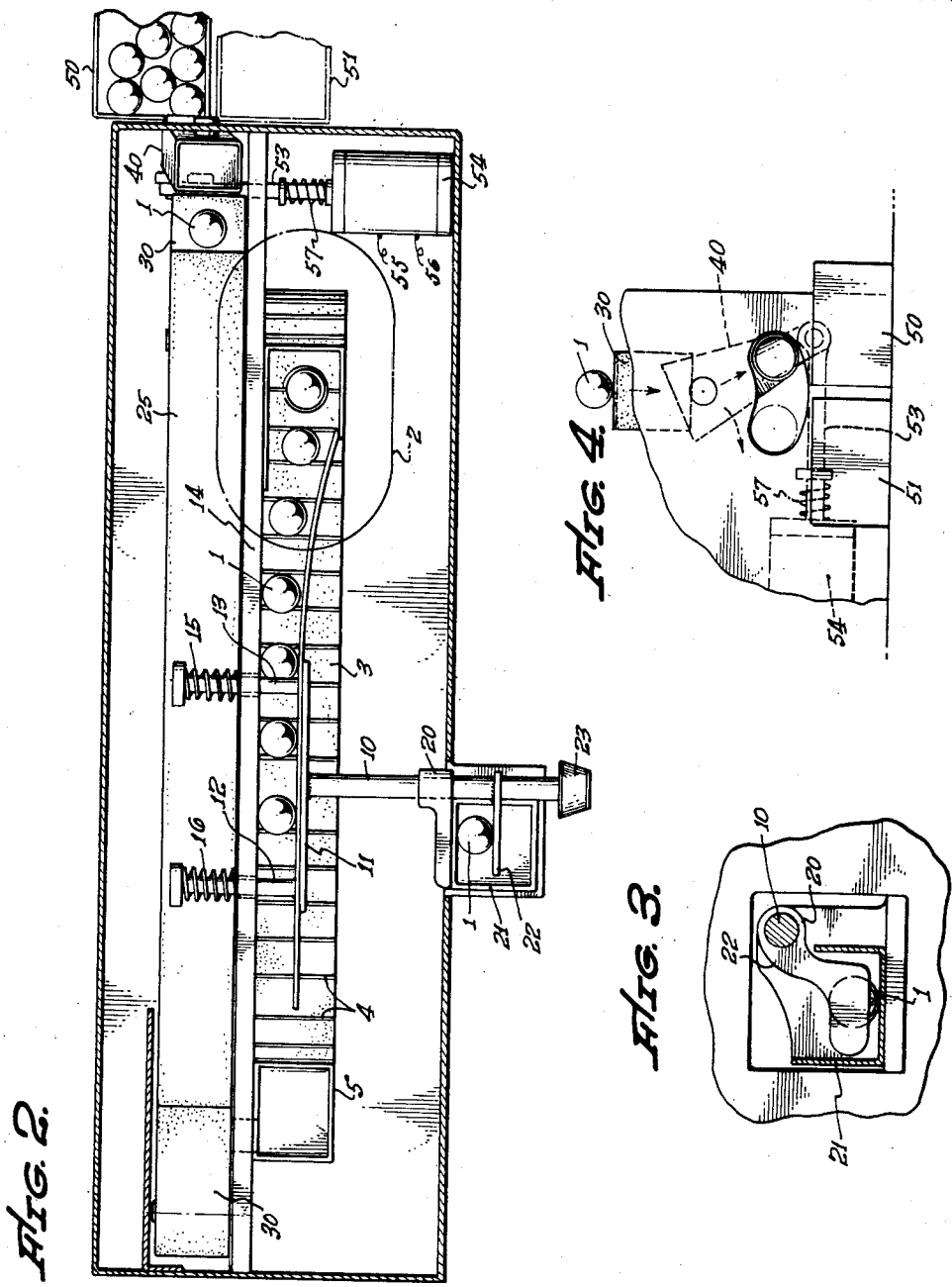
GEORGE O. SHECTER,
INVENTOR.
BY
ATTORNEY.

2,906,070
DEVICE FOR DISPENSING AND COUNTING HOMOGENEOUS OBJECTS
George O. Shecter, Los Angeles, Calif.
Application July 30, 1954, Serial No. 446,780
8 Claims. (Cl. 53—59)

This invention relates to a machine for counting and dispensing pills and similar homogeneous articles and has for its object to provide a simple and inexpensive device through which such pills may be carried rapidly and dependably. A further object is to provide a device of this type which may readily be adjusted to the size of the parts fed into the machine. Another object is to provide means for advancing the articles one by one at gradually increasing speed to the end that they may be spaced far enough apart at the time of counting to insure correct count.

These and other objects of the invention are hereinafter set forth in detail and drawings are hereto appended in which a preferred form of the invention is illustrated. In the drawings:

Fig. 2 is a substantially corresponding plan view of the device; and

Figs. 3 and 4 are fragmentary views of portions of the device.

Figure 1:
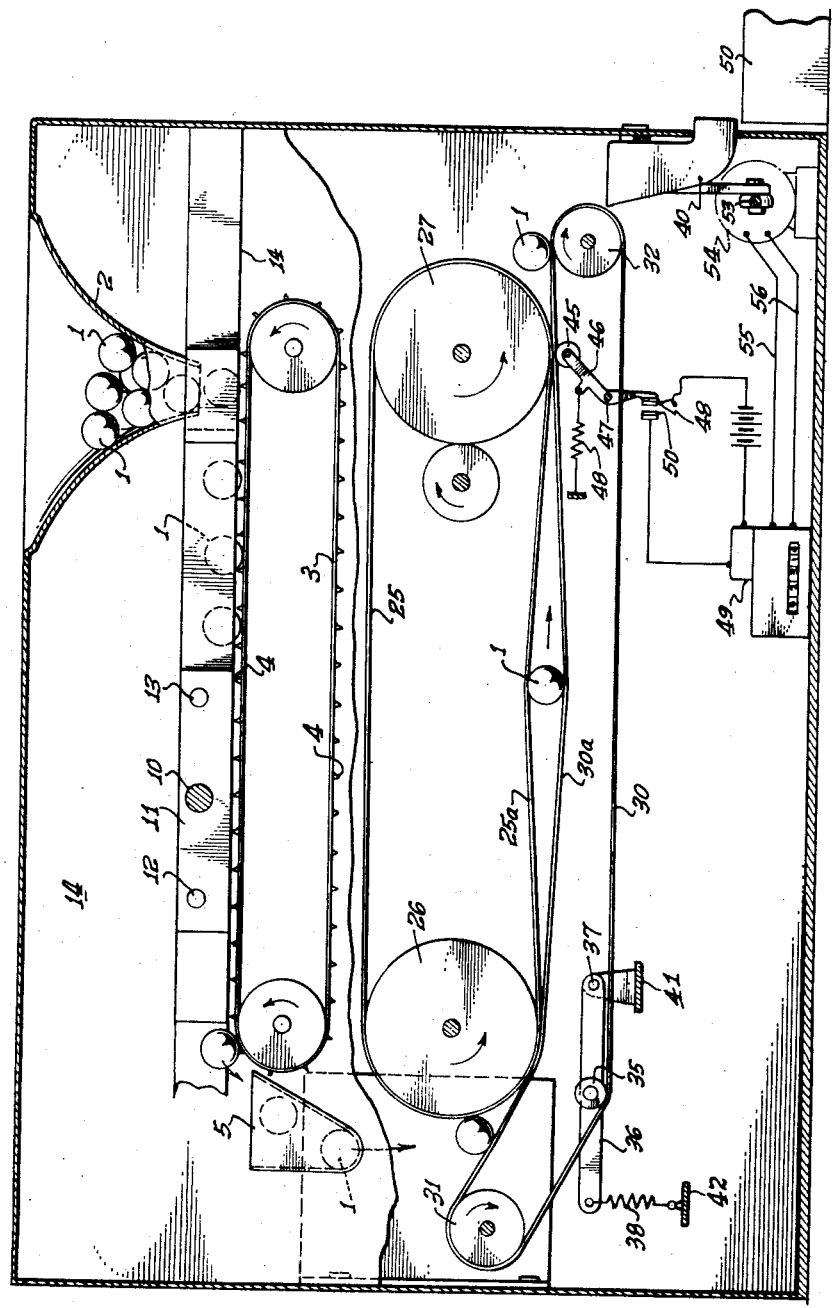
Fig. 1 is a side elevational view of a device embodying the invention.

Referring now to the drawings, in which the device of the invention is schematically outlined, the numeral 2 denotes a hopper into which the objects 1 to be sorted and counted are deposited in any suitable manner to land one by one on a continuously moving belt 3. Transverse equidistantly spaced protrusions 4 rise from this belt to receive therebetween the objects and to carry them one by one to a chute 5 at the end of the belt. The objects of each assortment to be counted and dispensed are all alike but the objects of one group may vary considerably in size from those of other groups. It is for this reason necessary to provide means for adjusting the above described mechanism correctly to feed the objects to the counting mechanism above which the mechanism is placed. This means is in the drawings shown to include a stem 10 which is seated for axial adjustment in the frame of the machine and a plate 11 is secured to the inner end of this stem. Headed studs 12, 13 project inwardly from this plate through passages of the machine frame bar 14 and compression springs 15, 16 are seated on the studs to urge the plate into contact with this bar. A bracket 20 rises from the machine frame to guide the stem 10 and a box-shaped receptacle 21 is shown mounted on or adjacent to the bracket. An arm 22 extends from the stem 10 into this receptacle. To set the mechanism for a particular size of objects, it is merely required manually to draw the stem outwardly and to drop one of the objects into the receptacle 21, behind the arm 22. The springs 15, 16 will then draw the stem and the plate 11 inwardly until arrested by the object within the receptacle, in doing this correspondingly to space the plate 11 away from the bar 14 of the frame. The objects can now only enter into the space one at a time and will be carried along on the belt without any danger of rolling about on the belt thereof. The stem is for convenient manual operation shown fitted with a knob 23.

A second belt 25 is placed at one side of the belt 3 on pulleys 26, 27 and a third belt 30 is hung on pulleys 31, 32 below this second belt, all substantially as indicated in the drawing. It is important to note that the pulleys 31, 32 are spaced farther apart than the pulleys 26, 27 and that the pulley 31 is placed higher than the pulley 32 thereby to cause the upper reach 30ª, of the belt 30 to pass upwardly a short distance around the periphery of the pulley 26. When the belt is supported in such manner, it is found that the objects discharged from the chute 5 will be caught and held in the space between the upper belt reach 30ª and the belt on the pulley 26. A roller 35 is mounted for rotation on a lever 36 which is pivotally mounted on the machine frame at 37. A spring 38 extends from the frame to the outer end of the lever to draw the lower reach of the belt 30 downwardly in so doing lightly to press the upper reach of the belt against the lower reach of the belt 25 on the pulleys 26, 27. All of the pulleys should be interconnected for simultaneous rotation to drive the belts in the directions indicated by the arrows of Fig. 1. And it is important to note that the driving connections should be proportioned to move the belts 25, 30 at a higher speed than the belt 3. When so proportioned, it is found that the objects landing in the crotch between the upper belt reach 30ª and the pulley 26 will pass around the pulley in doing so to force the belt reach away from the pulley, against the tension of the spring 38. The object will then be held snugly in position between the upper and lower belt reaches 25ª, 30ª as it is advanced therewith, finally to pass over the pulley 32 into a discharge chute 40. The belt 3 is in Fig. 1 for the sake of clearness raised above the belt 25, but it is preferred to lower this belt so that the object discharged from the chute 5 will be deposited more gently on the belt 30.

The object will, as it advances with the belts pass over a counting device which in the drawings is shown to include a roller 45. This roller is rotatably supported on the inner end of a lever 46 which, in turn, is pivotally mounted on a bracket 41 of the machine frame. A spring 48 extends from the lever to a bracket 42 of the frame yieldingly to urge the roller 45 against the two belt reaches directly below the axis of the pulley 27. A contact element 48 is mounted on the outer end of the lever to close a circuit through a counting relay 49 each time an object is passing between the pulley 27 and the roller 45 forces the latter downwardly thereby to move the contact 48 against the contact 50 of the counting relay.

The purpose of moving the belts 25, 30 at higher speed than the belt 3 is to increase the distance between the object passing under the roller 26 and the next following object dropping into the crotch between the belt and pulley. Time is thereby afforded for correct counting of the advancing objects.

As indicated in Figs. 2 and 4 of the drawings, two receiving containers 50, 51 are provided and it is important to note the discharge chute 40 is mounted for oscillating movement to direct the objects into one of these containers. A rod 53 extends from the core of a solenoid magnet 54 to the chute and the magnet is by conduits 55, 56 out into a counting relay circuit in such a manner that the magnet becomes energized the moment a predetermined number of objects has been counted to swing the chute on its pivot into registration with the other container, against the tension of a compression spring 57. This position would be maintained until the relay counts back to zero, thereby opening the contacts to deenergize the solenoid whereupon the spring would return the discharge chute to its position above the first named container. This same return to zero movement of the relay can be utilized to shut off the machine.

I claim:

1. A device for dispensing and counting homogeneous objects comprising, a hopper, a belt for receiving and advancing the objects one by one from said hopper, adjustable guide means adjusted by objects of the same size as the objects being conveyed to limit the width of the space on said belt to the size of the objects advanced thereon, two parallel belts placed one above the other with the adjacent reaches thereof in contact with each other, said two belts moving at higher uniform speed than the first named belt, means for guiding the advancing objects into the space between the adjacent reaches of said two belts for advancement therewith, means actuated by the objects as they advance with the belts for counting the objects.

2. A device for dispensing and counting homogeneous objects comprising, a hopper, a belt for receiving and advancing the objects one by one from said hopper, manually operable adjustable guide means adjusted by objects of the same size as the objects being conveyed to limit the width of the space on said belt to the size of the objects advanced thereon, two parallel belts placed one above the other with the adjacent reaches thereof in contact with each other, said two belts moving at higher uniform speed than the first named belt, means for guiding the advancing objects into the space between the adjacent reaches of said two belts for advancement therewith, means actuated by the objects as they advance with the belts for counting the objects.

3. A device for dispensing and counting homogeneous objects comprising a frame, a hopper in the frame, a belt for receiving and advancing the objects one by one from said hopper, a bar in the frame extending along one edge of said belt, a stem seated in the frame for sliding movement perpendicular to said bar, a plate on the end of the stem in parallel relation to the bar, springs urging movement of said plate over the surface of the belt toward the bar, means adjusted by objects of the same size as the objects being conveyed for limiting the plate movement to provide sufficient space between the plate and bar for successive advancement of the objects therebetween, two parallel belts placed one above the other with the adjacent reaches thereof in contact with each other, said two belts moving at higher uniform speed than the first named belt, means for guiding the advancing objects into the space between the adjacent reaches of said two belts for advancement therewith, means actuated by the objects as they advance with the belts for counting the objects.

4. A device for dispensing and counting homogeneous objects comprising a frame, a hopper in the frame, a belt for receiving and advancing the objects one by one from said hopper, two horizontally disposed belts placed one above the other with the adjacent reaches thereof in mutual contact, said two belts moving at higher uniform speed than the first named belt, means for yieldingly pressing the adjacent reaches of the two belts together, said means including a lever pivotally mounted in the framing, a roller on said lever extending across the surface of the lower reach of the lower belt and a spring urging movement of the lever to tighten the belt, means for guiding the advancing objects into the space between the adjacent reaches of said belts for advancement therewith, means actuated by the objects as they advance with the belts for counting the objects.

5. A device for dispensing and counting homogeneous objects comprising a frame, a hopper in the frame, a belt for receiving and advancing the objects one by one from said hopper, means for guiding the objects advancing on the belt, means for adjusting said guiding means to the size of the object advancing thereon, two superposed belts, said two belts moving at higher uniform speed than the first named belt, means for guiding the advancing objects into the space between the adjacent reaches of said two belts for advancement therewith, a circuit, a counting relay in the circuit, a lever pivotally mounted in the frame, a roller on said lever, a spring urging movement of the lever to press the roller against the innerside of the adjacent belt reaches, and a switch in the circuit, each object held and carried along between the belt reaches depressing said roller to swing the lever thereby to close the switch to actuate the counting relay.

6. A device for dispensing and counting homogeneous objects comprising, a hopper, a belt for receiving and advancing the objects one by one from said hopper, manually operable adjustable guide means adjusted by objects of the same size as the object being conveyed to limit the width of the space on said belt to the size of the objects advanced thereon, two parallel belts placed one above the other with the adjacent reaches thereof in contact with each other, said two belts moving at higher uniform speed than the first named belt, means for guiding the advancing objects into the space between the adjacent reaches of said two belts for advancement therewith, means actuated by the objects as they advance with the belts for counting the objects, and means for alternately discharging the objects into containers at the end of each count.

7. A device for dispensing and counting homogeneous objects comprising a hopper adapted to contain such objects, a conveyor having a generally horizontal run below said hopper to receive objects dropping therefrom and to discharge said objects individually from said conveyor, two parallel belts below said conveyor, one belt being disposed below said other belt with the adjacent reaches thereof substantially in contact with each other, the lower belt extending upwardly beyond the upper belt at one end to form a cradle into which the objects can drop individually from said conveyor, the distance between the point of discharge from said conveyor to said lower belt being substantially greater than the largest dimension of a homogeneous object, means for moving said belts at a higher speed than said conveyor to further space the objects received from said conveyor from each other, and means actuated by the objects as they advance with the belts for counting the objects.

8. A device for dispensing and counting homogeneous objects comprising a hopper adapted to contain such objects, a conveyor having a generally horizontal run below said hopper to receive objects dropping therefrom and to discharge said objects individually from said conveyor, two parallel belts below said conveyor, one belt being disposed below said other belt with the adjacent reaches thereof substantially in contact with each other, the lower belt extending upwardly beyond the upper belt at one end to form a cradle into which the objects can drop individually from said conveyor, the distance between the point of discharge from said conveyor to said lower belt being substantially greater than the largest dimension of a homogeneous object, means for moving said belts at a higher speed than said conveyor to further space the objects received from said conveyor from each other, a circuit, a counting relay in said circuit, means actuated by each object as it advances with the belts to close the circuit through the counting relay, two containers adapted to receive the objects, a chute directing objects selectively from the belts to either of said containers, and a magnet in the circuit energized by the counting relay to move the chute at the end of each count from registry with one container into registry with the other container.

References Cited in the file of this patent

UNITED STATES PATENTS

| | | |
|---|---|---|
| 1,034,351 | Fiennes et al. | July 30, 1912 |
| 1,457,352 | Dreher | June 5, 1923 |
| 1,715,968 | Weber et al. | June 4, 1929 |
| 1,763,084 | Bausman | June 10, 1930 |
| 1,976,211 | Bickford | Oct. 9, 1934 |
| 2,113,078 | Campbell | Apr. 5, 1938 |
| 2,133,264 | Wolff | Oct. 11, 1938 |
| 2,515,965 | Nurnberg | July 18, 1950 |
| 2,523,517 | Potter | Sept. 26, 1950 |
| 2,536,516 | Peterson | Jan. 2, 1951 |
| 2,589,792 | Frank et al. | Mar. 18, 1952 |
| 2,763,108 | Garrett | Sept. 8, 1956 |
| 2,764,351 | Broscomb et al. | Sept. 25, 1956 |